March 14, 1944.  C. L. OCON ET AL  2,344,103
METHOD FOR CONDUCTING CONTACT CATALYST
CONVERSIONS OF FLUID REACTANTS
Filed June 27, 1940  2 Sheets-Sheet 2

INVENTORS
CECILIO L. OCON
ERNEST A. OCON
BY
ATTORNEY.

Patented Mar. 14, 1944

2,344,103

UNITED STATES PATENT OFFICE 2,344,103

METHOD FOR CONDUCTING CONTACT CATALYST CONVERSIONS OF FLUID REACTANTS

Cecilio L. Ocon and Ernest A. Ocon, Yonkers, N. Y.; said Cecilio L. Ocon assignor to said Ernest A. Ocon Application June 27, 1940, Serial No. 342,813

9 Claims. (Cl. 196—52)

This invention relates to a method for conducting contact catalysis conversions of fluid reactants. More particularly, this invention relates to a method for efficiently maintaining adequate active catalyst surface to secure more uniform space velocities in continuous catalytic chemical conversions of vapor phase hydrocarbon reactants, while the catalyst becomes progressively poisoned by deposition of tarry products or by any other strongly adsorbed inhibiting bodies, such as sulphurous compounds, etc., which might be present among or formed by the reactants and their reaction products.

Even most widely acclaimed catalytic processes and apparatus of current interest for cracking and for polymerizing hydrocarbons to produce motor fuels have exhibited very detrimental characteristics in operations and design. They have lacked the essentials of steady and uniform conversion rates in continuous operation by failing to take into account that as a catalyst mass becomes poisoned, the actual space velocity undergoes a great variation. Exhaustive use of the catalyst as poisoning proceeds through the catalyst bed has been ignored in them. They do not contain satisfactory provision for facilitating the removal of a spent catalyst and replacement with a fresh catalyst.

To remedy the noted detrimental characteristics in the design and operation of continuous catalytic processes and apparatus is an important object of this invention. This is approached by providing a method which permits automatic regulation and uniformity of actual space velocities, a more exhaustive use of active catalyst before regeneration or renewal of the catalyst, a better control of regeneration in situ, and ready accessibility to the catalyst masses in the reaction chamber for easy and quick removal and replacement of the catalytic masses. These and other objects will be apparent from the following description.

To make this invention easily and fully understood, an explanation will now be made with reference to the drawings, which illustrate diagrammatically apparatus and arrangement thereof in a simplified form. For the sake of simplicity, a manually operated form is shown. In the drawings the same reference characters are used to denote parts having duplicate forms and functions.

Fig. 5 shows schematically a floor plan view for a five-chamber arrangement.

Figure 1:
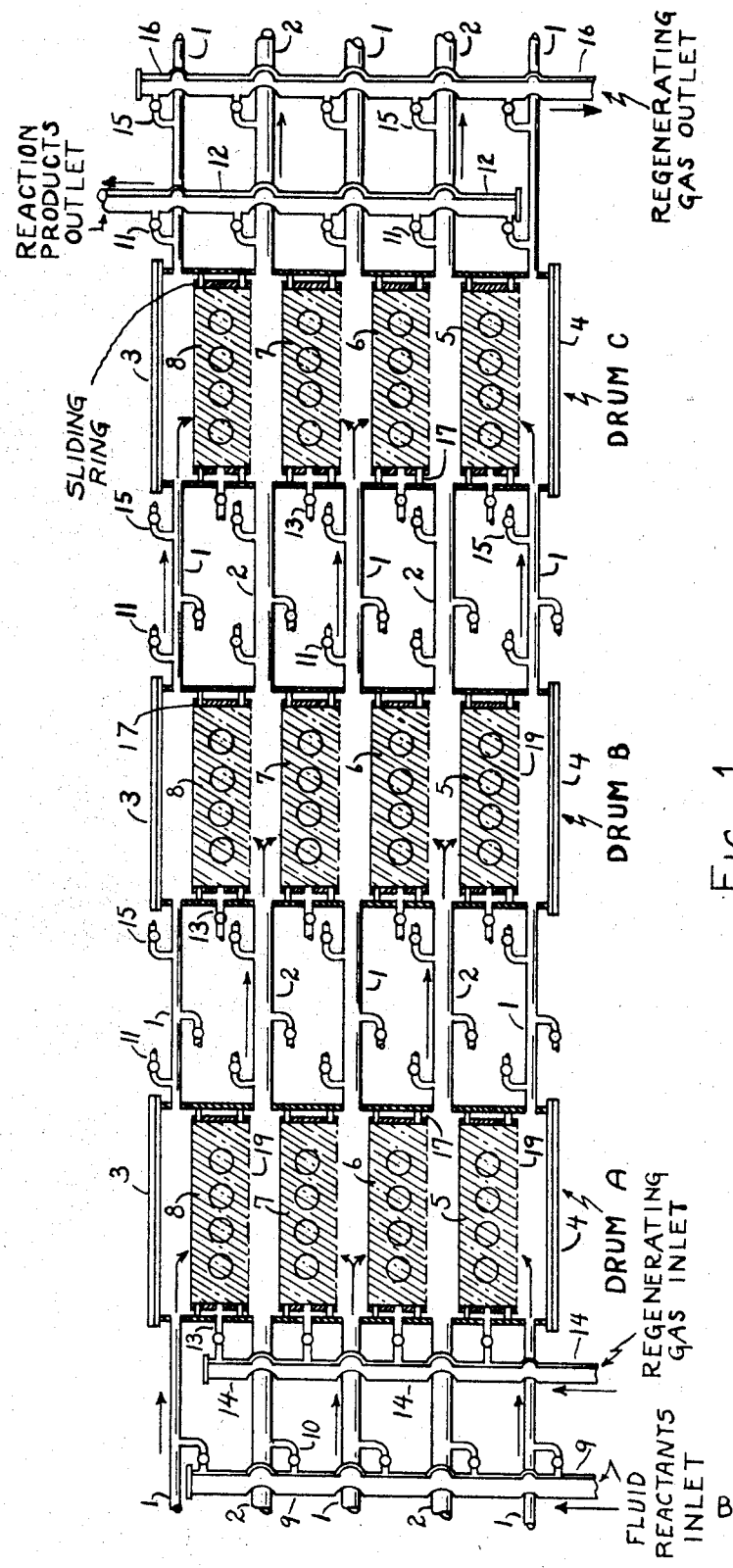
Fig. 1 illustrates a cross-sectional view of interconnected catalytic chambers, each provided with a set of catalyst beds and their joint relationship in a plant.
Figure 3:
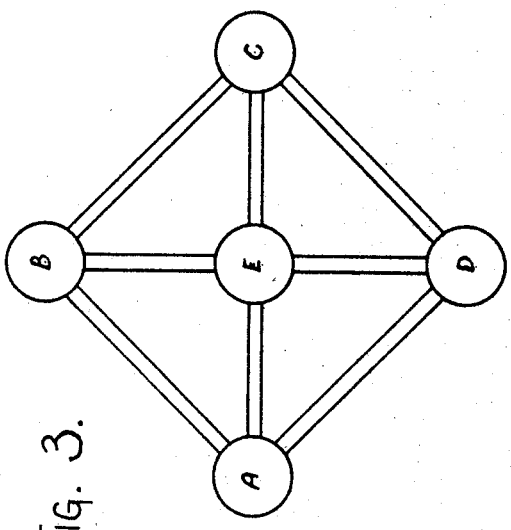

In Fig. 1 a plurality of vertical, cylindrical, reaction drums, e. g., A, B, and C, are shown in a linear arrangement for convenience. As will be pointed out later with reference to Figs. 2 and 3, other floor plan arrangements may be used for more centralized and convenient control, also for conservation of space and apparatus.

The drums are interconnected by vertical rows of horizontal pipes alternately numbered 1 and 2. Each drum may be simply constructed to carry a head plate 3 and base plate 4 tightly bolted or welded to upper and lower flanges of the drum wall, respectively.

During operation the interior of the drum is occupied by a set of two or more superimposed contact mass baskets or containers, which may be constructed for easy removal separately or as a unit, either through the top or bottom of the drum. The plurality of containers, such as the four shown in each drum and numbered 5, 6, 7 and 8, may rest one upon another except for the bottom one which may rest on the base plate of the drum. Each container may hold a separate bed of solid catalytic material from about 6 to 30 inches in depth supported on screen bottoms 19. The catalyst may be in the form of chunks, granules, pellets, blocks, etc. A catalyst bed will be referred to by the number of their containers, as shown in the drawings.

Each drum wall has a series of spaced and aligned openings for pipes 1 and 2 which act both as inlets and outlets, and the pipe ends may be joined to the drums so that the interior of the drum walls have no interference with sliding of the catalyst containers into and out of the drums. Also these pipes are spaced apart and located so that they can inject the fluid reactants into free spaces between the catalyst beds.

Figure 2:
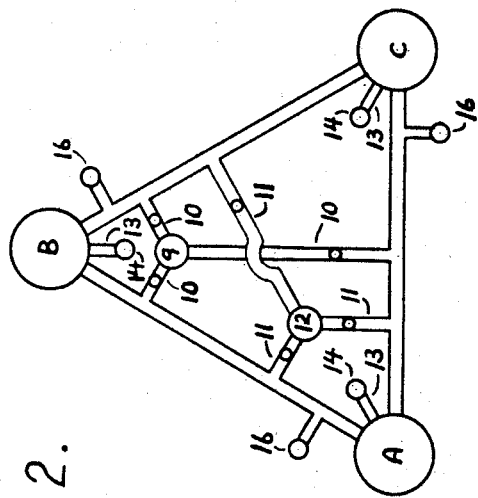
Fig. 2 shows schematically a floor plan view of triangular arrangement for three catalyst reaction chambers.

The pipes 1 and 2 may be supplied from a common supply header 9 or from separate manifolds with the intended reactant fluids, each of these pipes being provided with a valved connection 10 to the header, which leads to a supply source, as for example a vaporizer or heating tube (not shown). Similarly each of the pipes 1 and 2 has a valved connection 11 to a product off-take main 12, which may lead to conventional fractionating, condensing, and product recovery units (not shown). It is to be noted that for clarity, the joining of all valved connections 10 and 11 with a supply and product off-take header are not shown in Fig. 1, but this is indicated in Fig. 2.

For regeneration of the catalyst in situ, each drum is provided with a series of regenerating gas inlets 13, which may be joined to a common header 14 and have valves as indicated. Gaseous products of regeneration from any drum may be withdrawn by pipes 1 and 2 and diverted through a series of valved connections 15 to a withdrawal main 16. As will be explained later in greater detail, it is preferred to lead the regenerating gases into the center of each catalyst bed and this may be accomplished by having gas inlets disposed as shown in the drawings.

Where each pipe is provided with a valve the convention of a circle is shown in the drawings. It is to be observed that the valves may be aligned and connected with an automatic and timed adjusting means so that certain sets of valves are opened and closed at timed intervals.

The reaction drums may be assembled in various appropriate ways, e. g., the drums may be arranged in circles or disposed horizontally one superimposed above another, and the catalyst beds may have vertical arrangements which fit into the scheme of this invention. Other piping systems are in order, also, as for instance, supplementary inlets and outlets to and from the drums. Inlets may be multiple at entry to the drums. As indicated in Fig. 1 the interconnecting pipes should be proportioned in flow capacity to pass all streams and uniform space velocities through catalysts in each drum. Accordingly, the bottom and top pipes 1 are smaller in diameter than the intermediate pipes, because the intermediate pipes conduct the flow of streams that pass through two beds in each drum.

The catalyst containers may be made of materials which expand to prevent leakage between the sides and the inner drum walls, or other means may be used, such as expandable rings 17 fitted like piston rings in grooves 18 of the container sides. This modification is a feature of the invention which is useful in facilitating the removal of the catalyst containers from the drums.

Now, may be considered the manipulations of the improved catalytic reaction system as a unit containing provisions for steady and uniform reaction yields, exhaustive use of the active catalysts, efficient regeneration control, simplified automatic control and accessibility. Together with these manipulations the operating conditions will also be discussed.

In the apparatus system illustrated in Fig. 1 the catalyst drums are viewed as in a linear floor plan arrangement for the sake of clarity. Gasiform hydrocarbon reactants to be treated may be passed first from the supply main 9 into drum A by the set of pipes 1, the fluid reactant entering each pipe 1 through an open valved connection 10. From the inlets of pipes 1 in drum A, the reactants are forced to pass through an adjoining catalyst bed as indicated by the arrows. Thus inlet fluid reactants from the top pipe 1 pass downwardly through top catalyst bed 8, then are commingled with fluid reactants from the intermediate pipe 1 which pass upwardly through catalyst bed 7. A portion of fluid reactants from the intermediate pipe 1 pass downwardly through catalyst bed 6 to commingle with fluid reactants which pass upwardly through bottom catalyst 5 from bottom pipe 1. This operation is designated by the symbol 1A, the prescript 1 meaning that the reactants enter drum A by pipes 1, inlets 2 for drum A being closed.

The commingled fluid reactants and reaction mixture are led from between beds 8 and 7 and from between beds 6 and 5 by outlet pipes 2 to be conducted into the next reaction drum B intermediate the pairs of beds 8—7 and 6—5. This withdrawal operation from drum A is indicated by the symbol A2, hence the complete operation with drum A is indicated by 1A2, and the supply operation for drum B is indicated by the symbol 2B. In drum B from inlets 2 the reaction fluids pass upwardly through beds 6 and 8 and downwardly through beds 7 and 5, and the reaction products may be withdrawn from B by the set of pipes 1, i. e., by operation indicated by the symbol B1. If the reaction is completed at this point, these products may then be led from pipes 1 through their respective valved connections 11 to a withdrawal header 12 with leads to any desired conventional type of recovery unit or further processing unit.

After the system has been run according to the scheme above explained for a time, when the operation shows need of readjustment, which can be observed by the decline in yield rate, the flow directions may be reversed through each of the individual beds, and, if necessary, a new reaction drum may be brought into the system in substitution for a drum that requires regeneration or renewal. Thus for example after the described operation 1A2—2B1, drum B may be made the initial drum having the inlet fluid reactants thereto enter by the set of pipes 1, and the reaction fluids are passed from drum B to drum C by pipes 2 with final products withdrawn by pipes 1 from drum C, giving the operation 1B2—2C1.

Similarly, in subsequent operations drum C may be made the initial reaction zone and drum A, connected thereto by pipes 1 and 2, may be used to complete the reaction. While any set of drums is being used for the reaction the other drums may be subjected to catalyst regeneration or renewal operations. For the three drum system a floor plan arrangement as shown in Fig. 2 may be used. It will be readily understood that in Fig. 2 the connecting pipes and manifolds for supplying the reactants and regenerating gases and withdrawal of products of reaction and regeneration correspond to those shown in Fig. 1. In this triangular arrangement, common header 9 can be used for supplying the set of inlet pipes with reactants, and common header 12 may be used for withdrawal of reaction products from outlet pipes of any drum. Although each drum is shown to have a separate regenerating gas inlet manifold 14 and separate regeneration product outlet manifold 16, to simplify the drawing such manifolds may be obviously combined, if desired. In such arrangements, one drum can be isolated for purging the catalysts of all deposition of carbonaceous deposits and regeneration while any pair of drums are jointly in operation, and thus the operation may be made continuous.

As an example, the drums may be used in the following order using the symbols of operation which denote the inlet supply, the drum and the outlet:

| Drums in operation | Drums undergoing purging and regeneration |
|---|---|
| 1A2—2B1 | C |
| 1B2—2C1 | A |
| 1C2—2A1 | B |
| 1A2—2B1 | C |

With this method of operation any number of drums may be used jointly in operation as needed to obtain optimum operating conditions and greater constancy of high yield rate. The arrangement of Fig. 3 for five reaction drums is shown in a simple manner to illustrate how more than three drums may be used in the system so that three or more drums can be operated jointly while one or more drums are in a regeneration period of the cycle.

Figure 4:
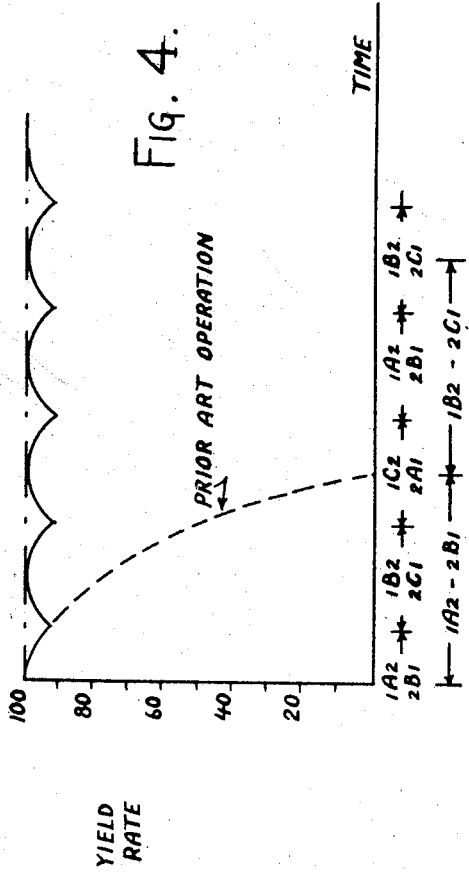
Fig. 4 is a graphical illustration of how yield rates are varied with time for different systems of catalytic conversions.

For reasons which will be more fully explained, operation in accordance with the present invention may be controlled for satisfactory use of more constant actual space velocities, meaning thereby that the rate of flow in volume of reactants per unit volume of active catalyst in a unit of time is maintained substantially constant and at a high degree with the result that the yield rate concomitantly is maintained at a high degree and more constant. The effectiveness of this operation for obtaining these results is illustrated graphically in Fig. 4 which shows that when yield rate is plotted against time or periods of operation expressed in terms of intermittent changes of operation the yield rate curve obtained with applicants' operation may be made to remain at a high level at all times in contradistinction to the yield rate curve plotted for a catalytic system which employs a uni-directional flow through a fixed volume of catalyst until that catalyst is degraded in activity and requires regeneration, resulting in wide variations of performance with highly accelerated decline in yield rate.

The factors which lead to a maintained high yield rate and a more exhaustive use of the catalyst are as follows:

1. Instead of using a fixed volume of catalyst situated in one or several drums for contact with a stream of reactants the fixed volume is divided in individual small catalyst beds located in separate drums which beds are employed in a series so that as soon as one catalyst bed of the series becomes deactivated to a certain extent another bed of catalyst located in another reaction drum is brought into the series in substitution for the deactivated bed, thus permitting a predetermined quantity of active catalyst to furnish the desired contact surface for the reactants.

2. A set of two or more of the individual small catalyst beds is disposed in each reaction drum and each individual bed in the drum contacts with a separate stream of reactants so that each bed forming a fraction of the catalyst in a drum simultaneously undergoes the same degree of deactivation by deposition of carbonaceous deposits or adsorption of poisons.

3. There is a tendency of stationary solid catalyst beds to channel in a uni-directional flow of the reactant fluids and for the parts of the catalyst beds which first contact with the fresh reactants to become deactivated before the portions of catalyst which are subsequently contacted. These deteriorating influences are largely overcome by the operation which permits reversal of flow through each of the catalyst beds in each of the reaction drums, therefore in each drum with all several beds or sections uniformly deactivated before exhaustion of the catalyst, requiring regeneration or renewal, a more complete use is made of the active catalyst surface and at any time sufficient beds in other drums are in service to maintain a high yield rate with a steady flow of reaction mixture.

The operation may be carried out with inexpensive catalytic materials which can be readily removed from the reaction drums as mentioned so that when the catalyst has lost its activity it can be replaced by fresh catalyst. However, if it is so desired, the catalyst may be regenerated in situ very efficiently by regenerating gases, such as oxidizing or reducing compounds that react with the catalyst poisons or inhibitors. For example, oxygen or air, which may be diluted with inert gases or steam, and which may be preheated, are led through the catalyst beds after the drum has been purged of gaseous hydrocarbons. Preferably the regenerating agent may be mainly passed into the central interior of each catalyst bed from inlets 13 so that a back pressure may be maintained on the regenerating gas as it advances toward the exterior of the beds where the concentration of inhibiting carbonaceous deposits reaches a maximum. This allows a better control of the regenerating reaction which in general is exothermic and tends to develop heat that might cause impairment of the active catalyst surface, for at elevated temperatures, e. g., above 900 or 1000° F., many of the catalyst materials sinter or fuse and thus lose their porosity and activity. The products of combustion or regeneration may be withdrawn through outlet pipes such as pipes 1 and 2 from the drum at points above and below the catalyst beds to be transferred by valved connections 15 to a withdrawal main 16. Thus a back pressure may be maintained by adjustment of the valves in these connections. This pressure being developed by inert purge gases together with products of combustion which can be regulated to keep the regenerating gas reaction from advancing too rapidly as it approaches and reaches the higher concentration of combustible carbonaceous deposits on the catalyst beds. Following the combustion stage of regeneration, any remaining oxygenating gas may be evacuated or purged from the drum. Purge gas may be injected and removed, for example by connections to pipes 1 and 2.

For proper temperature control each of the reaction drums may be surrounded by any desired types of heating and cooling means (not shown). For example, an electrical resistance coil or heat exchange jacket or coil may surround the exterior of the drums or be placed within the drums together with the catalyst containers and be removable therewith with means for controlling the amounts of heating or cooling in each section. Provision may also be made for maintaining the reaction temperature of the reaction mixtures as desired on passage between the drums by inserting heat exchange units (not shown) in the transfer lines 1 and 2 between the drums.

By varying the factors of temperature, time, and pressure and some small modifications in the catalyst, the system may be used to treat and convert various types of hydrocarbons according to their needs for producing valuable motor fuel products. For mainly refining gasoline or Diesel fuel, temperatures of the order of 350 to 700° F., and pressures of about 5 to 50 atmospheres, more or less, may be used. In splitting, cracking, or destructively hydrogenating hydrocarbons higher boiling than gasoline, such as gas oil, topped crude, and the like, temperatures in the range of about 800 to 950° F., with superatmospheric pressures ranging from about 2 to about 50 atmospheres or higher are preferred. In reforming naphthas or topped fractions of a crude oil the higher temperatures and pressures are more suitable. Pressures up to 100 atmospheres or higher may be used satisfactorily with gaseous reactants to increase the capacity of the system and favor polymerization or hydrogenation.

Two or more of the treatments or conversions may be carried out together under conditions advantageous for the different reactions, as for example, cracking and reforming even in the presence of some polymerizing may be effected.

The space velocities, measured in cubic feet of vapors, as under standard conditions, flowing through the catalyst zone per hour per cubic foot of catalyst, vary somewhat for each type of conversion. More time, which is roughly inversely proportional to the space velocity, is required for the polymerization than for the cracking reaction. In cracking a catalytic time of contact with an active catalyst is in the range of about 0.5 to about 10 or 15 minutes, less time being required at higher temperatures of the order of 800-900° F., or more. Necessarily the type of catalyst is also a factor on which time of treatment is dependent.

A very effective catalyst for cracking and which is also useful in reforming, polymerizing, and refining on account of its high porosity and resistance to sintering when subjected to oxidizing gases, such as air and steam for regeneration is obtained by mixing ground feldspar, preferably also weathered, or acid treated, with a weathered or acid treated clay or natural occurring silicious materials, or earths such as kieselguhr, kaolinite, bauxite, and similar materials. The mixture thus formed is preferably shaped into small pieces, acid treated, washed, and dried prior to use. This type of material is also useful for supporting other catalysts or promoters. As promoters, precipitated alumina, thoria and tungsten trioxide are particularly useful for aiding cracking and reforming. For promoting polymerization of gaseous hydrocarbons it is desirable to use larger proportions of the promoters, e. g., up to about 10%, or mixtures of promoters. In this connection, deliquescent phosphate or sulphate salts, such as copper sulphate, copper phosphate, phosphoric acids, etc., or other hygroscopic acidic substances are also usefully employed with the metal oxide promoters. Gaseous promoters may be employed in addition to the solid promoters or in their stead for accelerating polymerization and reforming reactions. Oxidizing gases such as oxygen, chlorine, and acid anhydrides of phosphoric acid or sulphuric acid, are useful in this respect. Metals which form readily reducible oxides such as nickel, cobalt, iron, etc., may be employed with the porous substrata such as the porous materials above mentioned for aiding in hydrogenation treatments when it is desired to add hydrogen to substantially pure unsaturated hydrocarbons.

As a specific example in which the system is to be used for polymerizing reactive gaseous hydrocarbons which include ethylene, propylene, butylene, amylene and similar gaseous hydrocarbons commonly present in the light vapors produced by cracking or splitting of natural hydrocarbon materials, these gases are passed first through a set of catalyst beds in drum A to a temperature in the range of about 500 to 900° F., and a pressure of the order of 5 to 50 atmospheres. Catalyst beds which have been successfully used are composed largely of hydroalumino silicates commonly known as clayey materials. These materials prior to use are beneficially pretreated by processes of weathering or washing and contain an admixed minor amount of ground or powdered feldspar which has been similarly pretreated. About 1 to 10% by weight of the feldspar increases porosity of the catalyst mass and increases its refractoriness toward sintering on calcination in drying and regeneration treatments.

As a further example of a particularly effective catalyst for the polymerization, a pretreated clayey material is mixed or impregnated with a mixed or complex salt of copper and phosphoric acid, notably copper uranium phosphate. This material is preferably obtained by partially dehydrating the natural occuring mineral known as torbernite.

In addition, an active metal oxide such as active alumina, obtained by precipitation of aluminum hydro-oxide followed by partial dehydration of the precipitated hydroxide, is admixed nearly homogeneously with the clayey material in a minor quantity of about 0.5 to 10% by weight prior to forming the catalyst into small pieces in the shape of blocks, pellets, etc., the thus formed catalyst is further improved prior to drying by soaking in a dilute solution of cupric sulphate and then calcined to obtain a porous refractory mass impregnated with the salt in substantially anhydrous state.

The gaseous reactants are passed through a series of the described catalysts in several beds at a suitable space velocity to give them a sufficient time of contact with active catalytic surface, the time of contact ranging from about a fraction of 1 minute to 5 minutes, or more, depending upon the temperature, effectiveness of catalytic surface, and concentration of reactive hydrocarbons. After the initial beds in the series of catalyst beds contacted by each stream of reactants has become deactivated by tarry depositions or other poisoning substances, the stream of reactants are continuously provided with adequate time of contact by substituting or supplementing an additional bed of the catalyst in an added drum as described.

Accordingly, a high rate of gasoline yield is maintained throughout the process without detrimental effects in the recovery system, and with fewer reactivations to obtain yields of greater than 4 gallons of gasoline motor fuel per thousand cubic feet of refinery gases processed, this motor fuel product having octane numbers up to 90, and often higher. This polymerized product has a high blending value for improving straight run gasolines and gasolines having insufficiently high octane numbers.

A period of operation may take from about 5 to 30 minutes or more, depending upon the type of reaction, catalyst, flow rates, temperatures and reactants, before the initial catalytic material contacted by the reactants in one of the reaction zones or drums becomes partially deactivated to an extent requiring readjustment, it is preferred to have the readjustment made before the yield rate drops by as much as 10% of the maximum. In the readjustment it is generally preferred to join into the series of beds contacted by the reactants an amount of catalyst equivalent to the amount deactivated, to omit the initial beds of the series and to reverse the direction of flow of the reactants through the remainder of the beds which were in operation before the addition of new beds. By this manipulation each bed in the series successively becomes an initial bed upon readjustment and with the reversal of flow in the beds that continue in operation these beds supply additional active catalytic surface that they retain and further act as guard beds for the purification of the reactants before the reactants contact subsequent beds of the series, doing so very efficiently because the reversal of flow eliminates channelling and exposes fresh catalytic surface more effectively to the fresh reactants.

After a set of beds in a reaction zone has had its activity well utilized as explained, the catalyst may be coated with inhibiting material varying from about 0.001% to about 10% by weight of the catalyst, the interior of the catalyst bed being relatively lightly coated and the exterior having a maximum amount of contamination. Thus when the regenerating gases are led into the central interior of a catalyst bed the rate of regeneration can be very conveniently kept under control. The regenerating gas may be brought into the interior of the catalyst beds at a suitable temperature to cause reaction with the contaminated deposits and under a sufficient pressure to overcome a back pressure of remaining inert purge gases so that the regenerating advances through the beds at any desired rate preferably the regeneration with an oxidizing agent such as air or air diluted with steam is conducted at a pressure ranging from about 1 atmosphere to about 5 atmospheres at a temperature of about 850 to 1000° F. When a reducing gas is used for regeneration either per se or subsequent to an oxidation regeneration a somewhat lower temperature and higher pressure are utilized, e. g., temperature in the range of about 200 to 800° F., and pressures of about 5 to 20 atmospheres or higher. A period of about 5 to 30 minutes is sufficient for purging, regenerating and readjusting a drum into the system.

The catalyst drums are manifolded and constructed to permit any drum to be removed from service without hindrance to the continuous operation. The yield rate can be determined from the uniformity of pressure since pressure drop indicates that a bed in the series used is becoming deactivated. The drums are conveniently constructed on a support and sufficiently elevated above the ground level to permit removal of the catalysts in their containers which slide easily upwardly or downwardly in the drums and are readily raised from the bottom or lowered from the top into the drum in refilling.

In accordance with the present process, shutdowns of the system are made infrequent, since as each bed becomes contaminated, substituted or supplementary beds are added in an inter-connected drum, thereby increasing the intervals between reactivation or prolonging the service of each drum while maintaining more constant yields with greater economy in labor, time, etc.

It is to be understood that with this improved system for catalytically converting reactant hydrocarbons other known catalysts and conditions may be used as alternatives or conjointly with those mentioned for promoting reactions including splitting, polymerizing, isomerizing, alkylating, hydrogenating, dehydrogenating and oxidizing reactions.

Instruments for measuring and controlling temperatures, pressures and flow velocities, and pumps or compressors for impelling the flow of fluids through conduits, and other control apparatus not shown or indicated are to be used for the operation described when required and in a manner well known in the art.

It is to be understood that this invention is not to be limited by theoretical considerations or specific illustrative examples used for purposes of illustration, but it is desired to claim all the invention in the broadest scope in the following claims.

We claim:

1. A process for catalytically treating carbonaceous fluid reactants continuously and uniformly with stationary solid catalytic adsorbent contact masses, which comprises arranging said contact masses into sets of individual catalyst beds, each set of beds being contained in a zone having individual points of entry of reactants to each bed and points of outlet for reaction products from each bed, passing a stream of gaseous reactant mixture into a free space above the uppermost bed in said zone to pass downwardly through said uppermost bed, simultaneously passing an intermediate stream of gaseous reactant mixture into a free space intermediate two additional beds disposed beneath the said uppermost bed from whence one portion of said intermediate stream will flow upwardly through one of said additional beds and another portion will flow downwardly through the remaining additional bed, simultaneously passing an additional stream of gaseous reactant mixture into a free space below the lowermost bed in said zone to pass upwardly through said lowermost bed, commingling the resulting reaction products passed downwardly through the said uppermost bed with resulting reaction products of said portion passed upwardly through one of said additional beds in a free space below said uppermost bed, commingling the resulting reaction products passed upwardly through the lowermost bed with the resulting reaction products of said stream passed downwardly through the second of said additional beds in a free space above said lowermost bed, and separately withdrawing the commingled reaction products from said zone in separate streams.

2. A process in accordance with claim 1, in which said zone is an initial zone in a series of zones, passing the first mentioned commingled stream into a free space below an uppermost bed and above an additional bed disposed below said uppermost bed in a subsequent zone, passing the second mentioned commingled stream into a free space above a lowermost bed and below an additional bed disposed above said lowermost bed in said subsequent zone, passing a portion of the first named stream upwardly through said uppermost bed, passing the remaining portion of said stream downwardly through said additional bed disposed below said uppermost bed, passing a portion of said second named stream downwardly through said lowermost bed, passing the remaining portion of said second named stream upwardly through said additional bed disposed above said lowermost bed, commingling the resulting reaction products passed through said additional beds in a free space intermediate said additional beds, withdrawing the commingled reaction products, separately withdrawing the resulting reaction products passed through said uppermost bed, and separately withdrawing the resulting reaction products passed through said lowermost bed.

3. A process in accordance with claim 1, in which each individual bed in said zone is contacted with a separate stream of gaseous reactant mixture and undergoes the same degree of deactivation during said contact.

4. A process in accordance with claim 1, in which the volume of said intermediate stream of gaseous reactant mixture is equivalent to the total volume of said streams passed through said uppermost and lowermost beds.

5. A process in accordance with claim 1, in which a catalyst bed in one zone is used in combination with a catalyst bed similarly disposed in a subsequent zone and contacted therein by a stream of reaction products passed therethrough in a flow direction opposite to the flow direction of said stream passed through said catalyst bed in said first named zone.

6. A process in accordance with claim 1, in which the plurality of streams of gaseous reactant mixture are passed through said catalyst beds under reaction conditions at a suitable space velocity, and the total volume of catalyst contacted by said streams being sufficient for the desired amount of treatment.

7. A process in accordance with claim 1, in which said carbonaceous fluid reactants comprise normally gaseous hydrocarbons, and said contact masses comprise adsorbent clayey material supporting a hygroscopic acidic polymerizing catalyst.

8. A process for catalytically treating carbonaceous fluid reactants continuously and uniformly with stationary solid catalytic adsorbent contact masses, which comprises arranging said contact masses into a series of sets of individual catalyst beds having a free space above and below each of said beds and each of said sets of beds being contained in a separate zone having individual points of entry of reactants to each bed and individual points of outlet for resulting reaction products from each bed, passing a heated stream of gaseous reactant mixture into a free space above the uppermost bed in an initial zone to pass downwardly through said uppermost bed, simultaneously passing an additional stream of gaseous reactants into a free space below the lowermost bed in said initial zone to pass upwardly through said lowermost bed, simultaneously passing an intermediate stream of gaseous reactant mixture into a free space intermediate two additional beds disposed below the said uppermost bed and above said lowermost bed from whence one portion of said intermediate stream will flow upwardly through one of said additional beds and the other portion will flow downwardly through the remaining additional bed, commingling the resulting reaction products passed downwardly through said uppermost bed with resulting reaction products of said portion passed upwardly through one of said additional beds in a free space below said uppermost bed, commingling the resulting reaction products passed upwardly through said lowermost bed with the resulting reaction products of said portion passed downwardly through the said remaining additional bed in a free space above said lowermost bed, separately withdrawing the commingled reaction products in separate streams from said initial zone, passing the stream of first mentioned commingled reaction products into a free space below an uppermost bed in a subsequent zone from whence one portion of said stream will flow upwardly through said uppermost bed and the remaining portion will flow downwardly through an additional bed disposed below said uppermost bed in said subsequent zone, passing the stream of second mentioned commingled reaction products into a free space above a lowermost bed in said subsequent zone from whence one portion will flow downwardly through said lowermost bed and the remaining portion will flow upwardly through an additional bed disposed above said lowermost bed, commingling the resulting reaction products passed through said additional beds in a free space below the first named additional bed and above the last named additional bed, and separately withdrawing the resulting reaction products from said subsequent zone in separate streams.

9. A process in accordance with claim 8, in which an additional set of beds in an additional zone is joined to the series in operation in substitution for said initial zone when the catalyst beds in said initial zone become deactivated, reversing the flow of reactants through each individual bed in the zone intermediate the initial zone and the additional zone, successively making the set of beds in each series in continuous operation the initial set of beds of the series to maintain the total predetermined amount of active catalyst contacted substantially constant, and regenerating the substituted set of beds for further operation.

CECILIO L. OCON.
ERNEST A. OCON.